United States Patent [19]

Ootsuka et al.

[11] 4,291,749

[45] Sep. 29, 1981

[54] METHOD AND APPARATUS FOR CONTROLLING COMPARTMENT TEMPERATURE OF A VEHICLE

[75] Inventors: Fumio Ootsuka, Kariya; Morimasa Ninomiya, Chiryu; Norio Maehara; Akiro Yoshimi, both of Kariya, all of Japan

[73] Assignee: Nippondenso Co., Ltd., Kariya, Japan

[21] Appl. No.: 98,598

[22] Filed: Nov. 29, 1979

[30] Foreign Application Priority Data

Dec. 27, 1978 [JP] Japan ............................... 53/162691

[51] Int. Cl.³ ........................................... F25B 29/00
[52] U.S. Cl. ..................................... 165/27; 165/43; 62/243; 236/49; 236/91 G
[58] Field of Search .............. 165/28, 27, 30, 42, 165/43, 14, 32; 237/12.3 A; 236/49, 91 G, 91 R; 62/239, 243, 244; 340/57, 600; 73/339 C, 355 R, 362 AR

[56] References Cited

U.S. PATENT DOCUMENTS

| | | | |
|---|---|---|---|
| 2,346,560 | 4/1944 | Crosthwait et al. | 236/91 G |
| 2,375,988 | 5/1945 | Gille et al. | 165/28 |
| 2,782,996 | 2/1957 | Sparrow | 236/91 G |
| 3,768,059 | 10/1973 | Day | 236/91 R |
| 3,801,008 | 4/1974 | Wenger | 236/49 |
| 4,024,725 | 5/1977 | Uchida et al. | 236/91 G |
| 4,058,254 | 11/1977 | Hallgreen | 73/339 C |

Primary Examiner—Albert W. Davis
Assistant Examiner—Margaret A. Focarino
Attorney, Agent, or Firm—Cushman, Darby & Cushman

[57] ABSTRACT

A temperature control method and apparatus responsive to various control conditions to determine the desired amount of temperature control to cause the compartment temperature of a vehicle to approach a desired value. They comprise a first step of producing a first control condition in response to the amount of light incident to the vehicle compartment and a second step of producing a second control condition in response to the amount of heat radiation incident to the vehicle compartment, and a third step whereby the second control condition is adjusted by the first control condition so as to compensate the amount of temperature control in accordance with the adjusted control condition.

3 Claims, 4 Drawing Figures

METHOD AND APPARATUS FOR CONTROLLING COMPARTMENT TEMPERATURE OF A VEHICLE

BACKGROUND OF THE INVENTION

The present invention relates to temperature control method and apparatus for controlling in such a manner that the compartment temperature of a vehicle on the road is automatically brought near to the desired value, and more particularly the invention relates to a temperature control method and apparatus designed to produce on the part of the occupants feeling of a comfortable control of temperature in response to the heat radiation of the sun incident to the compartment of a vehicle.

In the past, in controlling the compartment temperature of a vehicle on the road, from the standpoint of reducing the deviation of the compartment temperature from the desired value and lessening the direct effect of the heat radiation on the part of the occupants it has been considered desirable to sense the heat radiation of the sun so as to preliminarily compensate and adjust the amount of temperature control. Where such compensation is provided by performing electrical computation in response to various control input conditions so as to determine an amount of temperature control to bring the compartment temperature near to the desired value, it has been proposed to convert the heat radiation of the sun to an electric signal and to adjust the gain of the electrical computation in response to the electric signal.

A method of this type is known in the art in which a temperature responsive device is positioned to receive the heat radiation and the blown-out air temperature is adjusted according to the magnitude of an electric signal generated by the device.

However, while it has been the usual practice to arrange the temperature responsive device on the upper surface of the meter panel below the vehicle front glass or the like so as to position the device as close to the temperature control apparatus proper as possible and to ensure a rapid response to the heat radiation of the sun, generally the distribution of the temperature within the vehicle compartment is not uniform and this method also causes in some cases a deviation from the average temperature in addition to the deviation caused by the heat radiation of the sun. As a result, there is a disadvantage that particularly when driving at night or in the cloudy weather, unnecessary compensations will be provided in the control of the compartment temperature.

SUMMARY OF THE INVENTION

It is an object of this invention to provide a temperature control method wherein the measurement of the incident light quantity by a light responsive device is effected preferentially, whereby a compensation corresponding to the measured value of the heat radiation is provided so as to positively respond to the heat radiation of the sun.

It is another object of the invention to provide a temperature control method wherein the desired amount of temperature control for bringing the compartment temperature of a vehicle near to the desired value is determined in accordance with various input control conditions, the method comprising a first step of generating a first control condition in response to the quantity of the incident light to the vehicle compartment, and a second step of generating a second control condition in response to the quantity of the heat radiation incident to the vehicle compartment, and a third step whereby the second control condition is adjusted by the first control condition to compensate the amount of temperature control in accordance with the adjusted control condition.

It is still another object of the invention to provide a temperature control method and apparatus for use with a system for controlling the compartment temperature of a vehicle at the desired temperature, wherein the temperature of a compartment portion irradiated by the sun light and the intensity of the sun light are measured, whereby when the measured intensity is higher than a predetermined reference value, the desired temperature value is corrected in accordance with the temperature of the irradiated compartment portion.

It is still another object of the invention to provide an apparatus for controlling the compartment temperature of a vehicle, comprising means responsive to two predetermined high and low provisional temperatures and the ambient temperature to control and bring the compartment temperature between the two predetermined temperatures, means for measuring the temperature of a compartment portion irradiated by the sun light and the intensity of the incident sun light, and means whereby when the measured light intensity is higher than a predetermined reference value, the predetermined temperatures are lowered in accordance with the difference between the compartment temperature and the temperature of the irradiated portion.

DESCRIPTION OF THE PREFERRED EMBODIMENTS

Figure 1:
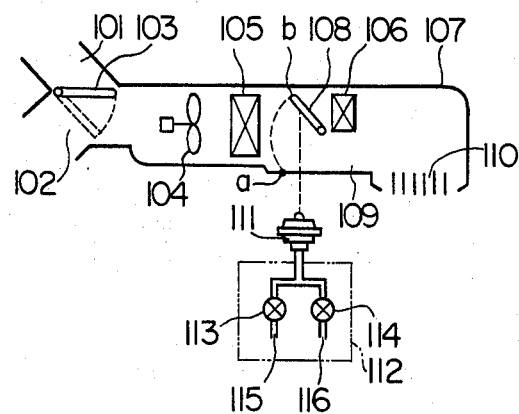
FIG. 1 is a schematic diagram showing the arrangement of the mechanical component parts in an embodiment of a temperature control apparatus for performing a temperature control according to the invention.

Referring to FIG. 1 showing the arrangement of the principal functional components of a temperature control apparatus for performing a temperature control in accordance with the invention, numeral 101 designates an outside air inlet port, 102 an inside air inlet port, 103 an outside/inside air selector damper for opening and closing the inlet ports 101 and 102, 105 a cooler of a cooling unit, and 106 a heater core which utilizes the engine cooling water as a heat source and which is connected in series downstream of the cooler 105 within a ventilating duct 107. Numeral 108 designates a temperature adjusting damper adapted to adjust the proportions of the air passing through the heater core 106 and the air passing through a bypass passage 109 and thereby to adjust the degree of heating by the heater core 106. Numeral 110 designates a port through which air is blown into the compartment of a vehicle, 111 a diaphragm actuator for opening and closing the damper 108, and 112 a negative pressure adjuster for adjusting the negative pressure supplied to the diaphragm actuator 111, which incorporates electromagnetic valves 113 and 114 for respectively opening and closing a negative pressure pipe 115 and an atmospheric air port 116.

The detailed constructions and functions of these components are equivalent to the known counter-parts whereby the opening of the damper 108 is varied so that the temperature of the blown-off air is varied and the temperature in the compartment is varied.

Figure 2:
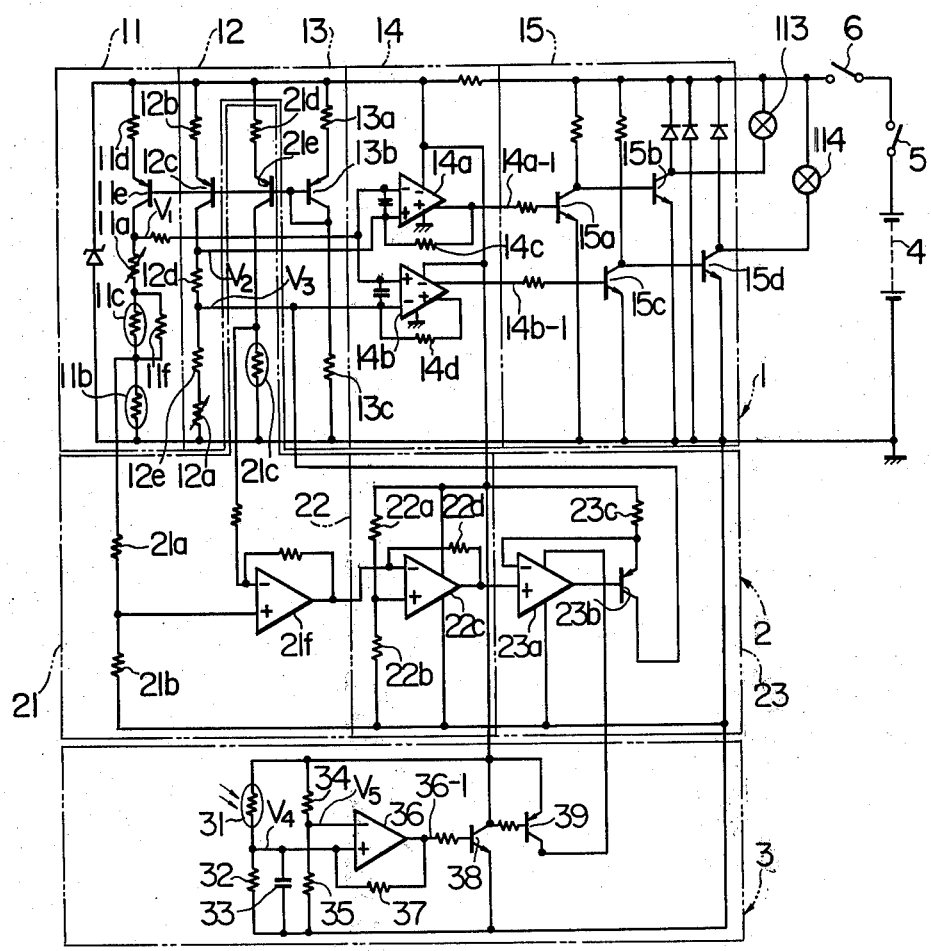
FIG. 2 is a wiring diagram showing an electric control system associated operatively with the temperature adjusting damper in FIG. 1.

FIG. 2 shows a temperature control circuit which is operatively associated with the functional components shown in FIG. 1. The temperature control circuit comprises, as divided according to the functions, a damper control circuit 1 responsive to the various control input conditions for opening and closing the electromagnetic valves 113 and 114 so as to adjust the opening of the temperature adjusting damper 108 and thereby to bring the vehicle compartment temperature near to the preset desired value, a compensating circuit 2 for generating an electric signal corresponding to the quantity of the heat radiation incident to the vehicle compartment and compensating the electric signal under predetermined conditions so as to vary the control input conditions to the damper control circuit 1, and a comparison and discrimination circuit 3 for detecting whether the quantity of the light incident to the vehicle compartment is higher than a predetermined value so as to allow the compensating action of the compensating circuit 2 when the detected incident light quantity is higher than the predetermined value.

Numeral 4 designates a vehicle DC power source, 5 an ignition switch, and 6 a temperature control circuit actuation switch for bringing the temperature control circuit into operation when both of the switches 5 and 6 are closed. The actuation switch 6 is operatively associated with a switch (not shown) which energizes a blower motor 104 and the switch 6 is also operatively associated with another switches (not shown) which bring the cooler 105 and the heater core 106 into operation.

In the damper control circuit 1, numeral 11 designates a temperature detecting circuit comprising a potentiometer 11a, an inside air sensor 11b, an outside air sensor 11c, an emitter resistor 11d, a transistor 11e and a characteristic adjusting resistor 11f. The inside air sensor 11b is disposed inside the vehicle compartment at a position where it is not exposed directly to the sun and the sensor 11b comprises a heat responsive resistance element of a negative temperature coefficient for measuring the temperature inside the vehicle compartment, and the outside air sensor 11c comprises a heat responsive resistance element of a negative temperature coefficient for measuring the temperature of the air outside the compartment for providing compensation against the effect of the outside temperature on the compartment temperature. Each of the sensors 11b and 11c is either adapted to utilize the linear portion of the temperature coefficient or compensated by the resistor 11f or the like to make the temperature coefficient linear. The potentiometer 11a is provided to negatively feedback the amount of movement of the temperature adjusting damper 108 for stabilizing the control system. Numeral 12 designates a temperature setting circuit comprising a desired temperature setting variable resistor 12a, an emitter resistor 12b, a transistor 12c, a "dead zone" setting resistor 12d and a bias resistor 12e. Numeral 13 designates a constant current control circuit comprising an emitter resistor 13a, a transistor 13b and a resistor 13c, and the base and collector of the transistor 13b and the bases of the transistors 11e and 12c are connected to each other. The operation of the constant current control circuit 13 controls the collector current of the transistor 11e in the temperature detecting circuit 11 at a fixed value determined by the emitter resistor 11d, and the collector voltage $V_1$ of the transistor 11e assumes a value corresponding to the collector current value and the composite resistance value of the potentiometer 11a, the inside air sensor 11b and the outside air sensor 11c. On the other hand, in the temperature setting circuit 12 a fixed collector current determined by the emitter resistor 12b flows so that a voltage $V_2$ corresponding to the product of the collector current value and the composite resistance value of the resistors 12a, 12d and 12e is produced in the collector of the transistor 12c and also produced between the resistors 12d and 12e is a voltage $V_3$ corresponding to the product of the collector current value and the composite resistance value of the resistors 12d and 12e.

Numeral 14 designates a comparator circuit forming a comparison circuit in association with the previously mentioned circuits 11, 12 and 13. Numerals 14a and 14b designate comparators, whereby when the voltage $V_1$ is higher than the voltage $V_2$, that is, when the controlled variable or the temperature which was measured is lower than the lower limit of the desired temperature, the comparator 14a causes an output line 14a-1 to go to a "0" level, whereas when the voltage $V_1$ is lower than the voltage $V_3$, that is, when the controlled variable or the temperature is higher than the upper limit of the desired temperature, the comparator 14b changes an output line 14b-1 to the "0" level. The comparators 14a and 14b form a so-called window comparator. Numerals 14c and 14d designate feedback resistors for respectively applying a hysterisis to the comparison inversion level of the comparators 14a and 14b, respectively.

Numeral 15 designates an amplifier circuit for inverting and amplifying the comparison signal of the comparators 14a and 14b, respectively, whereby when the output line 14a-1 is at the "0", a transistor 15a is turned off and a transistor 15b is turned on to energize and open the electromagnetic valve 113, atracting the temperature adjusting damper 108 in the direction of a point a so as to increase the temperature inside the vehicle compartment. When the output line 14b-1 goes to the "0" level, a transistor 15c is turned off and a transistor 15d is turned on so that the electromagnetic valve 114 is energized and opened and the temperature adjusting damper 108 is forced back in the direction of a point b so as to decrease the temperature inside the compartment. When the comparison signals on the output lines 14a-1 and 14-b are at the "1" level, the electromagnetic valves 113 and 114 are deenergized and closed so that the opening of the temperature adjusting damper 108 is held unchanged and the compartment temperature is also held unchanged.

The basic operation of the temperature control is designed to control the opening of the temperature adjusting damper 108 in such a manner that the detected voltage $V_1$ of the temperature detecting circuit 11 becomes intermediary of the preset voltages $V_2$ and $V_3$ of the temperature setting circuit 12. Thus the temperature control is accomplished to satisfy the following equations $$V_2 > V_1 > V_3 \tag{1}$$

$$V_1 = V_i + V_o + V_p = I_{11} \cdot (R_i + R_o + R_p) \quad (2)$$

$$V_2 = V_s + V_h = I_{12} \cdot (R_s + R_h) \quad (3)$$

$$V_3 = V_s = I_{12} \cdot R_s \quad (4)$$

where $I_{11}$ = the collector current of transistor 11e
$R_i$ = the resistance value of inside air sensor 11b
$R_o$ = the resistance value of outside air sensor 11c
$R_p$ = the resistance value of potentiometer 11a
$I_{12}$ = the collector current of transistor 12c
$R_s$ = the series composite resistance value of temperature setting resistor 12a and fixed resistor 12e
$R_h$ = the resistance value of dead zone setting resistor 12d In the compensating circuit 2, numerals 21 and 22 designate conversion circuits for converting the heat radiation of the sun into a voltage signal. The conversion circuit 21 comprises resistors 21a and 21b for dividing the voltage across the inside air sensor 11b, a heat radiation sensor 21c, an emitter resistor 21d, a transistor 21e and a differential amplifier 21f and the conversion circuit 21 generates a voltage corresponding to the difference between the resistance value of the inside air sensor 11b and the resistance value of the heat radiation sensor 21c. The heat radiation sensor 21c comprises a heat responsive resistance element having substantially the same temperature-voltage drop characteristic and its temperature-resistance characteristic as well as the emitter resistor 21d have been adjusted. The heat radiation sensor 21c is disposed at a position, such as a position on the meter panel, where it will be exposed to the direct rays of the sun. The base of the transistor 21e is connected to the base of the transistor 13b in the constant current control circuit 13 and consequently a constant current is supplied to the heat radiation sensor 21c causing it to generate a voltage corresponding to its resistance value. The resistance values of the resistors 21a and 21b are selected sufficiently high. The conversion circuit 22 is one which applies a predetermined bias to the voltage signal from the conversion circuit 21 and it comprises voltage dividing resistors 22a and 22b for generating a reference voltage, a differential amplifier 22c and a feedback resistor 22d.

Numeral 23 designates a known type of voltage-current conversion circuit comprising a differential amplifier 23a, a transistor 23b and a current adjusting resistor 23c whereby the voltage signal from the conversion circuit 22 is converted to a current signal and this current signal is supplied to the temperature setting circuit to vary the voltages $V_2$ and $V_3$. The power supplied to the differential amplifier 23a from the operating power source is switched on and off through the comparison circuit 3.

The comparison circuit 3 comprises a light sensor 31, a voltage dividing resistor 32, a capacitor 33, voltage dividing resistors 34 and 35 for reference voltage, a comparator 36, a feedback resistor 37 and switching transistors 38 and 39. The quantity of the incident light to the compartment is detected as a resistance value by the light sensor 31 and a voltage signal $V_4$ corresponding to the light quantity is generated at the junction of the light sensor 31 and the voltage dividing resistor 32. The voltage signal $V_4$ is applied to the comparator 36 where it is compared with the reference voltage produced by the voltage dividing resistors 34 and 35 and the transistors 38 and 39 are turned on or off in response to the resulting comparison signal. The light sensor 31 comprises a known type of light sensitive resistance element such as a cadmium sulfide cell and it is disposed for example on the meter panel in the compartment where it is exposed to the incident light from above, whereby the internal resistance value of the light sensor 31 is decreased with an increase in the quantity of the incident light to the compartment and the voltage signal $V_4$ is increased. The capacitor 33 serves as a filter which eliminates instantaneous changes in the light quantity. The light quantity is indicated in terms of illuminance (lux) and generally it is considered that the illuminance of the ground exposed direct to the sun is 100,000 luxes, that of the ground on a gray cloudy day 10,000 to 20,000 luxes and that of the ground in the shade on a fine day about 10,000 luxes. In the present embodiment, the voltage dividing resistors 32, 34 and 35 are adjusted so that the comparison circuit 3 sets a threshold value of several tens thousands luxes. Thus, the incident light intensity from a road light or the like in the night will have a value which is sufficiently lower than the threshold value and the comparison circuit 3 is not responsive to the incident lights other than the light rays of the sun.

When the light sensor 31 is exposed to a large quantity of light rays such as the rays of the sun, its terminal voltage $V_4$ becomes greater than a reference voltage $V_5$ having the above-mentioned preset threshold value so that an output line 36-1 of the comparator 36 goes to the "0" level and the transistors 38 and 39 are respectively turned off and on. As a result, the differential amplifier 23a of the compensating circuit 2 is connected to the power source to get ready to perform the compensating action.

In FIG. 2, those circuit elements having no reference numerals are provided to aid suitably to realize the circuit construction and functions which have been described so far.

Figure 3:
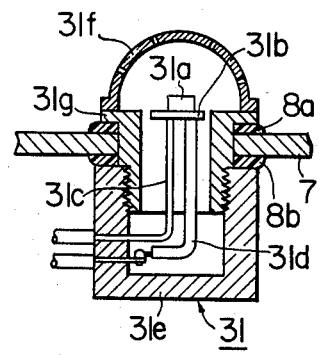
FIG. 3 is a longitudinal sectional view showing the mechanical construction of the sun light sensor in FIG. 2.

FIG. 3 shows the construction of the light sensor 31, and a sensor proper 31a is fixedly mounted on a base 31b with two lead wires 31c and 31d being held in place by a lower housing 31e. Numeral 31f designates a translucent semispherical skylight for transmitting the rays of the sun and it is fixedly mounted on the upper end of a cylindrical intermediate housing 31g. The intermediate housing 31g is threadedly fitted in the lower housing 31e and in this way the light sensor 31 is fixedly mounted on a meter panel upper plate 7 through the intermediary of ring packings 8a and 8b. Some ventilating holes may be formed in the semispherical skylight 31f. Each of the semispherical skylight 31f, the intermediate housing 31g and the lower housing 31e is made of a plastic material and the material for the housings 31g and 31e, respectively, is opaque.

Figure 4:
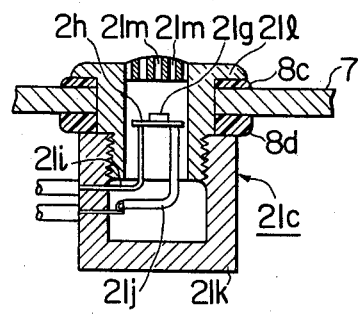
FIG. 4 is a longitudinal view showing the mechanical construction of the heat radiation sensor in FIG. 2.

FIG. 4 shows the construction of the heat radiation sensor 21c, in which a sensor proper 21g is fixedly mounted on a heat receiving plate 2h and two lead wires 21i and 21j are held in place by a lower housing 21k. Numeral 21l designates an upper housing having a large number of holes 21m in the upper surface thereof and it is adapted to cause in the sensor section (21g, 21h) a temperature rise due to the heat radiation of the sun. The upper housing 21l is threadedly fitted in the lower housing 21k and in this way the heat radiation sensor 21c is fixedly mounted on the meter panel upper plate 7 through ring packings 8c and 8d.

With the construction described above, the operation of the embodiment will now be described. When the ignition switch 5 and the actuation switch 6 are closed, the power is supplied to the temperature control circuit and the operation of the temperature control apparatus is initiated. Assuming that there are no incident light rays of the sun so that the comparison circuit 3 determines that the input light quantity is lower than the threshold value and consequently the compensating circuit 2 performs no compensating action, the ordinary operation of the temperature control will be described first.

When the compartment temperature is within the limits of the desired temperature, the detected voltage $V_1$ is in the range which satisfies the relation $V_3 < V_1 < V_2$ so that the comparison signals of the comparators 14a and 14b both go to the "1" level and the electromagnetic valves 113 and 114 are both closed, thus maintaining the temperature adjusting damper 108 in a predetermined position.

When the compartment temperature becomes lower than the limits of the desired value, the resistance value of the inside air sensor 11b increases so that the detected voltage $V_1$ is increased to $V_1 > V_2$ and consequently the comparison signal 14a-1 of the comparator 14a goes to the "0" level. When this occurs, the electromagnetic valve 113 is opened and the negative pressure applied to the diaphragm actuator 111 is increased, moving the damper 108 toward the high temperature side (toward the point a side in FIG. 1) and increasing the degree of heating by the heater core 106 so as to increase the temperature of the blown-off air. When the damp 108 is moved to the high temperature side so that the resistance value of the potentiometer 11a is decreased thus making $V_1 < V_2$, the electromagnetic valve 113 is returned to the closed position.

On the contrary, when the compartment temperature becomes higher than the limits of the desired value so that the resistance value of the inside air sensor 11b is decreased and the detected voltage $V_1$ is decreased to $V_1 < V_3$ causing the comparison signal 14b-1 of the comparator 14b to go to the "0" level, the electromagnetic valve 114 is opened and the negative pressure applied to the diaphragm actuator 111 is decreased. As a result, the damper 108 is moved toward the low temperature side (the point b side in FIG. 1) by the force of a spring which is not shown and the degree of heating by the heater core 106 is decreased, thus decreasing the temperature of the blown-off air. When the damper 108 is moved to the low temperature side so that the resistance value of the potentiometer 11a is increased and the detected voltage $V_1$ becomes $V_1 > V_3$, the electromanetic valve 114 is returned to the closed position.

In this way, the balanced position of the damper 108 is determined so that the detected voltage $V_1$ assumes a value within the range of $V_3 < V_1 < V_2$ and in this way the compartment temperature is maintained within the limits of the desired value. When the outside air temperature changes, the resistance value of the outer air sensor 11c varies correspondingly and the temperature adjusting damper 108 is moved by an amount corresponding to the change of the outside air temperature so as to cause the potentiometer 11a to compensate against a decrease in the detected voltage $V_1$. In this way, the characteristics of the sensors and the magnitudes of the collector currents of the transistors 11e and 12c are predetermined so that a change in the terminal voltage of the potentiometer 11a due to a change in the amount of control (a change of the opening) of the temperature adjusting damper 108 is balanced against a change in the voltage due to a change in the resistance value of the respective sensors.

Next, where there is the radiation of heat of the sun, the compensation by the temperature control will be provided as follows. When the vehicle is running on a fine day so that the resistance value of the light sensor 31 is low and the voltage $V_4$ is sufficiently higher than the reference voltage $V_5$, the transistor 39 is turned on and the differential amplifier 23a is supplied with the power from the power source. The resistance value of the heat radiation sensor 21c is dependent only on the compartment temperature in the absence of any heat radiation of the sun, and where there is any such heat radiation the resistance value is decreased in proportion to the intensity of the heat radiation. As a result, the difference in voltage drop between the inside air sensor 11b and the heat radiation sensor 21c is directly converted by the conversion circuits 22 and 23 into a voltage signal corresponding to the intensity of the heat radiation. This voltage signal is converted by the voltage-current conversion circuit 23 into the collector current of the transistor 23b. This output current from the compensating circuit 2 flows through the resistor 12e and the setting variable resistor 12a of the temperature setting circuit 12 and consequently the preset voltages $V_2$ and $V_3$ are increased by an amount corresponding to the increase in the current. Since the damper control circuit 1 controls the temperature control damper 108 so as to bring the detected voltage $V_1$ into the dead zone of the preset voltages $V_2$ and $V_3$ as mentioned previously, the opening of the temperature adjusting damper 108 is compensated to the temperature decreasing side (toward the point b side) by an amount corresponding to the increase in the preset voltages $V_2$ and $V_3$ caused in response to the intensity of the heat radiation. The amount of this compensation is increased with an increase in the amount of the heat radiation. In this connection, the relation between the amount of heat radiation and the amount of compensation may be adjusted by adjusting for example the resistance value of the resistor 23c.

When the running vehicle alternately comes into the sun and the shade, as for example, when the vehicle comes into and out of the tunnels, though there is some delay due to the capacitor 33, the comparison circuit 3 responds quickly in a few seconds and a transition from the compensating to non-compensating condition or vice versa takes place on all such occasions.

A preferred embodiment of the temperature control apparatus for performing the method of this invention has been described so far and it is apparent that changes and modifications may be made to the apparatus without departing from the scope of the invention.

For instance, in order to detect whether the light quantity is greater than a predetermined value, a light responsive switching device comprising for example a phototransistor and having a suitably adjusted bias may be used so as to utilize its switching output to show the result of the detection. While, in the embodiment described previously, the amount of control by the temperature control is determined through the electrical analog computation, the method of this invention may also be applied to a system which utilizes digital computation. Further, the method of this invention may also be applied to a system in which the required digital computation is performed by means of a digital computer comprising a so-called microcomputer in accordance with a predetermined software control program to thereby accomplish the temperature control. In this case, the control program may be predetermined in such a manner that the program step for detecting whether the light quantity is greater than a predetermined value is performed preferentially and in accordance with the result of the detection the amount of heat radiation is inputted, thus performing, in accordance with the inputted value, the program step for compensating the computation of the temperature control.

Further, while, in the above-described embodiment, the incident light quantity is detected to see whether it is greater than a predetermined value and thereby to determine whether the compensation corresponding to the amount of heat radiation is to be provided, it is possible to arrange so that the amount of incident light is measured continuously or in a stepwise manner so as to adjust the amount of the compensation corresponding to the amount of the heat radiation to some extent in accordance with the measured value.

It will thus be seen from the foregoing description that in accordance with the temperature control method of this invention, by virtue of the fact that the quantity of the incident light to the compartment of a vehicle is preferentially detected so as to effect the temperature compensation corresponding to the amount of heat radiation in accordance with the result of the detection, there is a great advantage that where there is the radiation of heat involving a sufficient light quantity, that is, when there is the radiation of heat of the sun, a quick response is ensured with the result that means having a quick response may be used for detecting the amount of heat radiation without the danger of causing any erroneous compensation to thereby ensure an accurate temperature control.

We claim:

1. An apparatus for controlling the temperature of the compartment of an automobile having cooler means for supplying the cooled air, heater means for supplying the heated air and adjuster means for adjusting the rate of supply of said cooled and heated air to said compartment, said apparatus comprising:
   means for establishing a desired compartment temperature;
   means for sensing an actual compartment temperature;
   means for controlling said adjuster means in rsponse to said desired and actual compartment temperature so that said actual compartment temperature approaches said desired compartment temperature;
   means for sensing another actual temperature at a predetermined compartment portion where the heat of the sun is radiated;
   means for sensing the intensity of the sun light incident to said compartment;
   means for comparing said sensed intensity with a reference intensity; and
   means for compensating, when the output of said comparing means indicates that said sensed intensity is higher than said reference intensity, the operation of said controlling means in accordance with said another actual temperature.

2. An apparatus for controlling the temperature of the compartment of an automobile having cooler means for cooling the air supplied to said compartment, heater means for heating the cooled air passing to said compartment therethough, and damper means positioned between said cooler means and said heater means for adjusting the rate of said cooled air passing through said heater means, said apparatus comprising:
   means for establishing a desired high and low compartment temperature;
   means for sensing an actual compartment temperature;
   means for sensing an ambient temperature outside said compartment;
   means for correcting said actual compartment temperature by said ambient temperature;
   means for controlling said damper means in response to said desired compartment temperatures and said corrected actual compartment temperature so that said corrected actual compartment temperature is maintained between said desired high and low compartment temperature;
   means for sensing another actual temperature at a predetermined compartment portion where the heat of the sun is radiated;
   means for obtaining the difference between said actual compartment temperature and said another actual temperature;
   means for sensing the intensity of light of the sun incident to said compartment;
   means for comparing said sensed intensity of the the sun light with a reference intensity; and
   means for lowering said desired high and low compartment temperatures, when the output of said comparing means indicates that said sensed intensity is higher than said reference intensity, in accordance with said difference between said actual compartment temperature and said another actual temperature.

3. A method for controlling the temperature of the compartment of an automobile having cooler means for supplying the cooled air, heater means for supplying the heated air and adjuster means for adjusting the rate of supply of said cooled and heated air to said compartment, said method comprising the steps of:
   establishing a desired compartment temperature;
   sensing an actual compartment temperature;
   controlling said adjuster means in response to said desired and actual compartment temperatures so that said actual compartment temperature approaches said desired compartment temperature;
   sensing another actual temperature at a predetermined compartment portion where the heat of the sun is radiated;
   sensing the intensity of the sun light incident to said compartment;
   comparing said sensed intensity with a reference intensity; and
   compensating, when said sensed intensity is higher than said reference intensity, said rate of supply adjusted by said adjuster means in accordance with said another actual temperature.

* * * * *